US010100775B2

(12) United States Patent
Ota et al.

(10) Patent No.: US 10,100,775 B2
(45) Date of Patent: Oct. 16, 2018

(54) DIRECT INJECTION ENGINE

(71) Applicant: MAZDA MOTOR CORPORATION, Hiroshima (JP)

(72) Inventors: Noriyuki Ota, Yokohama (JP); Yoshihisa Nou, Hiroshima (JP); Akira Kageyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/666,884

(22) Filed: Aug. 2, 2017

(65) Prior Publication Data
US 2018/0038306 A1 Feb. 8, 2018

(30) Foreign Application Priority Data
Aug. 8, 2016 (JP) .................................. 2016-155451

(51) Int. Cl.
*F02D 41/40* (2006.01)
*F01L 1/34* (2006.01)
*F02F 3/26* (2006.01)
*F02D 41/38* (2006.01)

(52) U.S. Cl.
CPC .............. *F02D 41/402* (2013.01); *F01L 1/34* (2013.01); *F02F 3/26* (2013.01); *F02D 2041/389* (2013.01)

(58) Field of Classification Search
CPC .. F02D 41/40; F02D 41/402; F02D 2041/389; F02F 3/26; F01L 1/34
See application file for complete search history.

(56) References Cited

U.S. PATENT DOCUMENTS 5,724,927 A * 3/1998 Suzuki ...................... F01L 1/34
123/445
6,851,408 B2 * 2/2005 Hotta .................... F02B 17/005
123/279

FOREIGN PATENT DOCUMENTS

| JP | 2007-211596 A | 8/2007 |
|---|---|---|
| JP | 2009-019502 A | 1/2009 |
| JP | 2011-058372 A | 3/2011 |
| JP | 2011-106369 A | 6/2011 |
| JP | 2011-169288 A | 9/2011 |
| JP | 2013-194712 A | 9/2013 |

(Continued)

OTHER PUBLICATIONS

An Office Action issued by the Japanese Patent Office dated Oct. 3, 2017, which corresponds to Japanese Patent Application No. 2016-155451 and is related to U.S. Appl. No. 15/666,884; with English language concise explanation.

*Primary Examiner* — Hieu T Vo
(74) *Attorney, Agent, or Firm* — Studebaker & Brackett PC

(57) ABSTRACT

A fuel injection valve is caused to inject fuel in a latter half of a compression stroke in such a manner that a fuel concentration immediately before start of combustion is higher in a middle portion of a combustion chamber than in an outer peripheral portion thereof in a low load range where the engine load is lower than a predetermined set reference load. An intake valve driving device is controlled in such a manner that an intake valve closing timing in the low load range is advanced on a retard side with respect to an intake bottom dead center in a case where the engine speed is high, as compared with a case where the engine speed is low, and intake air within a cylinder is blown back toward an intake port at least in a range where the engine speed is low.

4 Claims, 15 Drawing Sheets

(56) References Cited

FOREIGN PATENT DOCUMENTS

| JP | 2015-048839 A | 3/2015 |
|----|---------------|--------|
| JP | 2015-063941 A | 4/2015 |

* cited by examiner

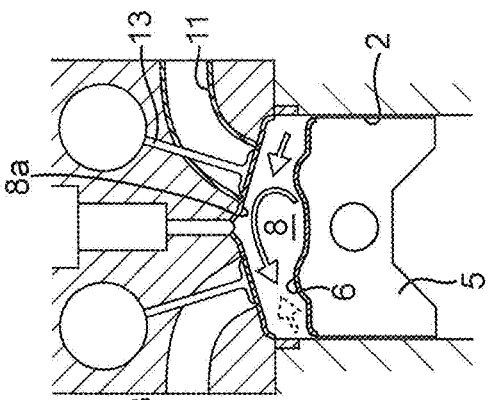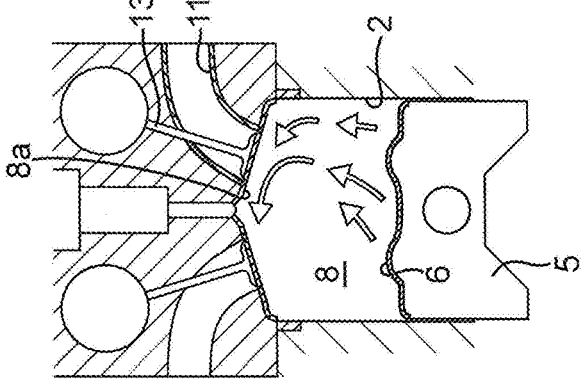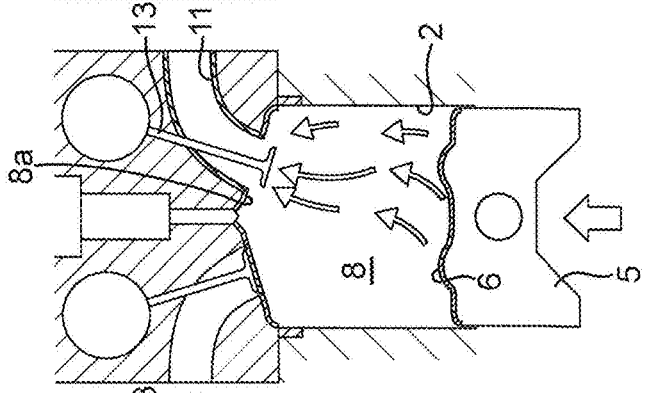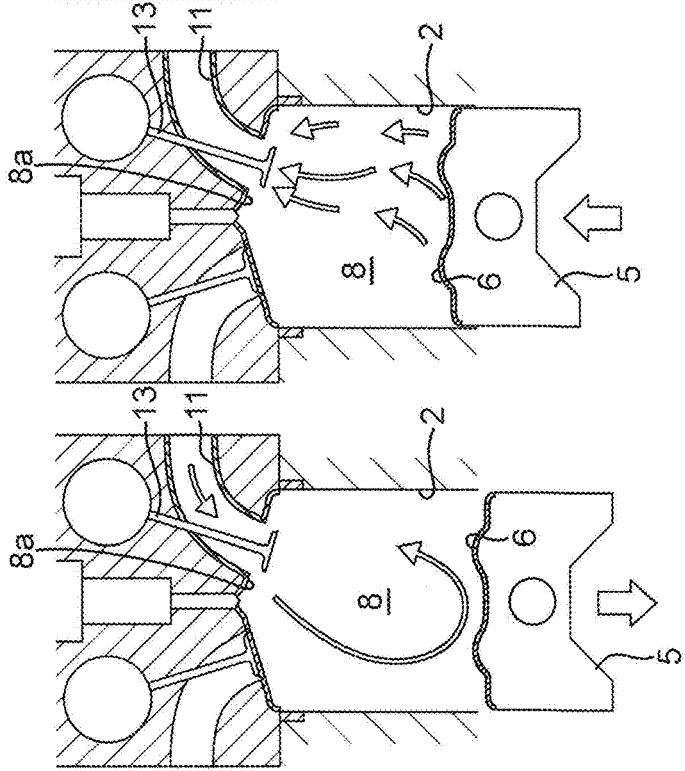

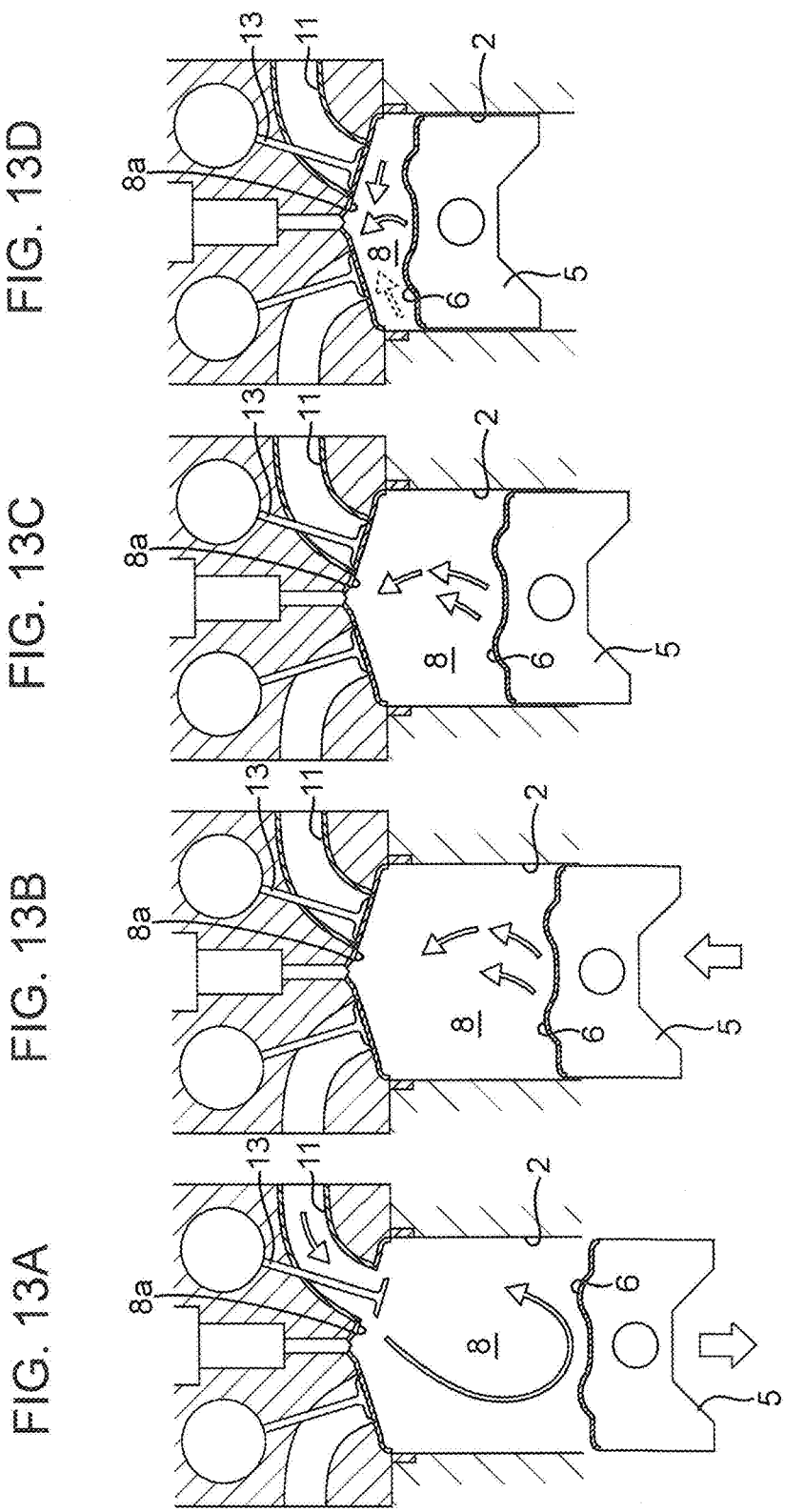

FIG. 14A
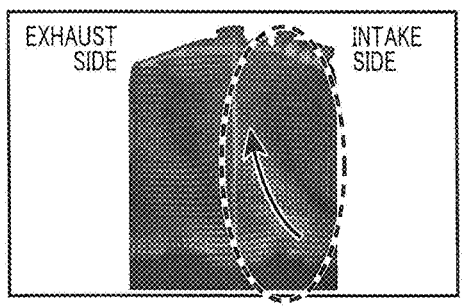
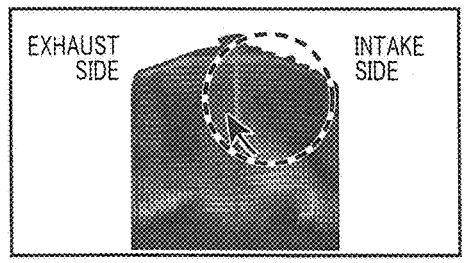
FIG. 14B
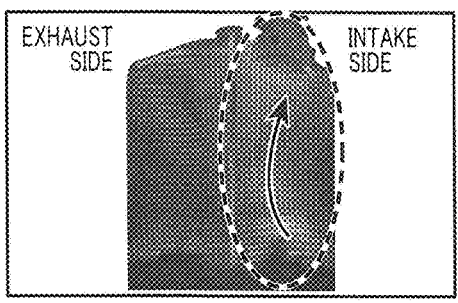
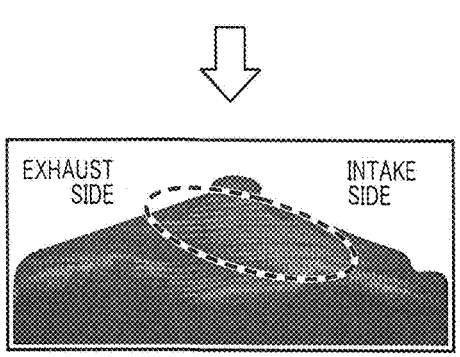

DIRECT INJECTION ENGINE

TECHNICAL FIELD

The present invention relates to a direct injection engine provided with a cylinder including a combustion chamber in which a piston is mounted to be reciprocally movable.

BACKGROUND ART

Conventionally, in an engine, there is a demand for reducing energy loss i.e. cooling loss accompanied by release of heat energy of combustion gas from a wall surface of a combustion chamber to the outside of the engine in order to enhance fuel economy.

For instance, Japanese Unexamined Patent Publication No. 2013-194712 discloses an engine, in which a combustion speed of a fuel-air mixture is increased by adding ozone to intake air introduced to a combustion chamber so as to terminate combustion before flame reaches a wall surface of the combustion chamber. With use of the engine, it is possible to suppress heat energy from being released to the outside of the engine via a wall surface of a combustion chamber due to contact of high temperature flame with the wall surface of the combustion chamber.

In the engine disclosed in Japanese Unexamined Patent Publication No. 2013-194712, it is necessary to install an ozone generation device within an intake pipe or the like in order to add ozone to intake air. This may complicate the structure of the engine and may be disadvantageous in terms of cost. In view of the above, there is a demand for reducing cooling loss with a simplified configuration. Further, also in the engine disclosed in Japanese Unexamined Patent Publication No. 2013-194712, in a case where intake air flows along a wall surface of a combustion chamber within the combustion chamber before start of combustion, a fuel-air mixture is generated in the vicinity of the wall surface of the combustion chamber, and consequently, it is not possible to sufficiently avoid contact of combustion gas with the wall surface of the combustion chamber.

SUMMARY OF INVENTION

In view of the above, an object of the present invention is to provide a direct injection engine which enables to advantageously reduce cooling loss accompanied by contact of combustion gas with a wall surface of a combustion chamber.

In order to solve the aforementioned inconveniences, the present invention is directed to a direct injection engine provided with a cylinder including a combustion chamber in which a piston is mounted to be reciprocally movable. The direct injection engine includes an intake port opened in a ceiling surface of the combustion chamber, and configured to introduce intake air to the cylinder; an intake valve configured to open and close an opening portion of the intake port; a fuel injection valve mounted on the ceiling surface of the combustion chamber, and configured to inject fuel toward a crown surface of the piston; an intake valve driving device configured to open and close the intake valve, and to change a closing timing of the intake valve; an injection control unit configured to cause the fuel injection valve to inject fuel in a latter half of a compression stroke in such a manner that a fuel concentration immediately before start of combustion is higher in a middle portion of the combustion chamber than in an outer peripheral portion of the combustion chamber in a low load range where an engine load is lower than a predetermined set reference load; and a valve control unit configured to control the intake valve driving device in such a manner that a closing timing of the intake valve in the low load range is advanced on a retard side with respect to an intake bottom dead center in a case where an engine speed is high, as compared with a case where the engine speed is low, and that intake air within the cylinder is blown back toward the intake port at least in a range where the engine speed is low.

According to the direct injection engine of the present invention, it is possible to enhance fuel economy by effectively reducing cooling loss with a simplified configuration.

These and other objects, features and advantages of the present invention will become more apparent upon reading the following detailed description along with the accompanying drawings.

BRIEF DESCRIPTION OF DRAWINGS

FIGS. 9A to 9C are diagrams illustrating a relationship between an injection pattern and a shape of a fuel-air mixture layer in a low load range, wherein FIG. 9A is a diagram in a first injection mode, FIG. 9B is a diagram in a switching injection mode, and FIG. 9C is a diagram in a second injection mode;

FIGS. 10A to 10D are diagrams schematically illustrating an intake flow within a cylinder in a case where a closing timing of an intake valve is on a retard side, wherein FIG. 10A is a diagram illustrating a state before an intake bottom dead center, FIG. 10B is a diagram illustrating a state after the intake bottom dead center and immediately before an intake valve is closed, FIG. 10C is a diagram after the intake valve is closed, and FIG. 10D is a diagram illustrating a state in the vicinity of a compression top dead center;

FIGS. 13A to 13D are diagrams schematically illustrating an intake flow within a cylinder in the embodiment, wherein FIG. 13A is a diagram illustrating a state before an intake bottom dead center, FIG. 13B is a diagram after the intake bottom dead center, and immediately before an intake valve is closed, FIG. 13C is a diagram illustrating a state after the intake valve is closed, and FIG. 13D is a diagram illustrating a state in the vicinity of a compression top dead center;

FIGS. 14A and 14B are diagrams illustrating a result of numerical calculation of an intake flow within a cylinder, wherein FIG. 14A illustrates a result of the present invention, and FIG. 14B illustrates a result of a comparative example; and FIGS. 15A and 15B are diagrams illustrating a temperature distribution of combustion gas, wherein FIG. 15A illustrates a temperature distribution of the present invention, and FIG. 15B illustrates a temperature distribution of the comparative example.

DESCRIPTION OF EMBODIMENTS (1) Overall Configuration of Engine System

Figure 1:
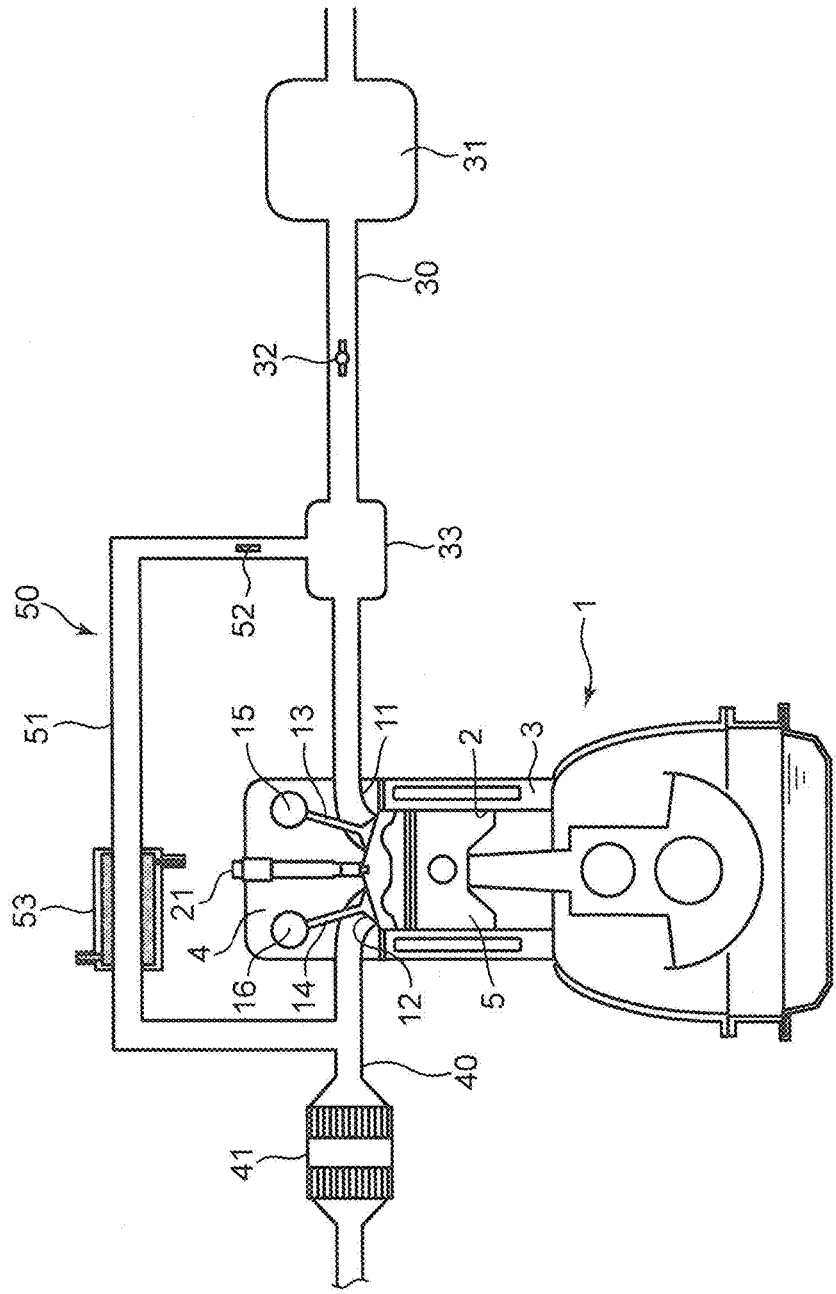
FIG. 1 is a diagram illustrating a configuration of an engine system according to an embodiment of the present invention.

FIG. 1 is a diagram illustrating a configuration of an engine system to which a direct injection engine according to an embodiment of the present invention is applied. The engine system of the embodiment includes a 4-stroke engine body 1, an intake passage 30 configured to introduce air for combustion to the engine body 1, an exhaust passage 40 configured to discharge exhaust gas generated in the engine body 1, and an EGR device 50 configured to return a part of exhaust gas to intake air. The engine body 1 is, for instance, a 4-cylinder engine having four cylinders 2. Although the type of fuel to be supplied to the engine body 1 is not limited, in the embodiment, fuel containing gasoline is used. The engine system is mounted in a vehicle, and the engine body 1 is used as a drive source for the vehicle.

An air cleaner 31, a throttle valve 32, and a surge tank 33 are provided in the intake passage 30 in this order from the upstream side. Air passing through these elements is introduced to the engine body 1.

The throttle valve 32 is configured to open and close the intake passage 30. Note that in the embodiment, the throttle valve 32 is basically kept to a fully opened state or to an opening degree approximate to the fully opened state during an operation of the engine. The throttle valve 32 is closed only in a certain operating condition such as a time when the engine is stopped to close the intake passage 30.

A catalyst device 41 containing a three-way catalyst or the like, and configured to purify exhaust gas is provided in the exhaust passage 40.

The EGR device 50 includes an EGR passage 51, an EGR valve 52 configured to open and close the EGR passage 51, and an EGR cooler 53. The EGR passage 51 connects between an upstream portion of the exhaust passage 40 with respect to the catalyst device 41, and a downstream portion of the intake passage 30 with respect to the throttle valve 32 (in the example illustrated in FIG. 1, the surge tank 33). A part of exhaust gas flowing through the exhaust passage 40 is returned to the intake passage 30 through the EGR passage 51. The amount of exhaust gas returning to the intake passage 30, namely, the amount of EGR gas is adjusted by the opening amount of the EGR valve 52. The EGR cooler 53 is configured to cool EGR gas. After being cooled by the EGR cooler 53, EGR gas is returned to the intake passage 30.

(2) Configuration of Engine Body

Next, a configuration of the engine body 1 is described.

Figure 2:
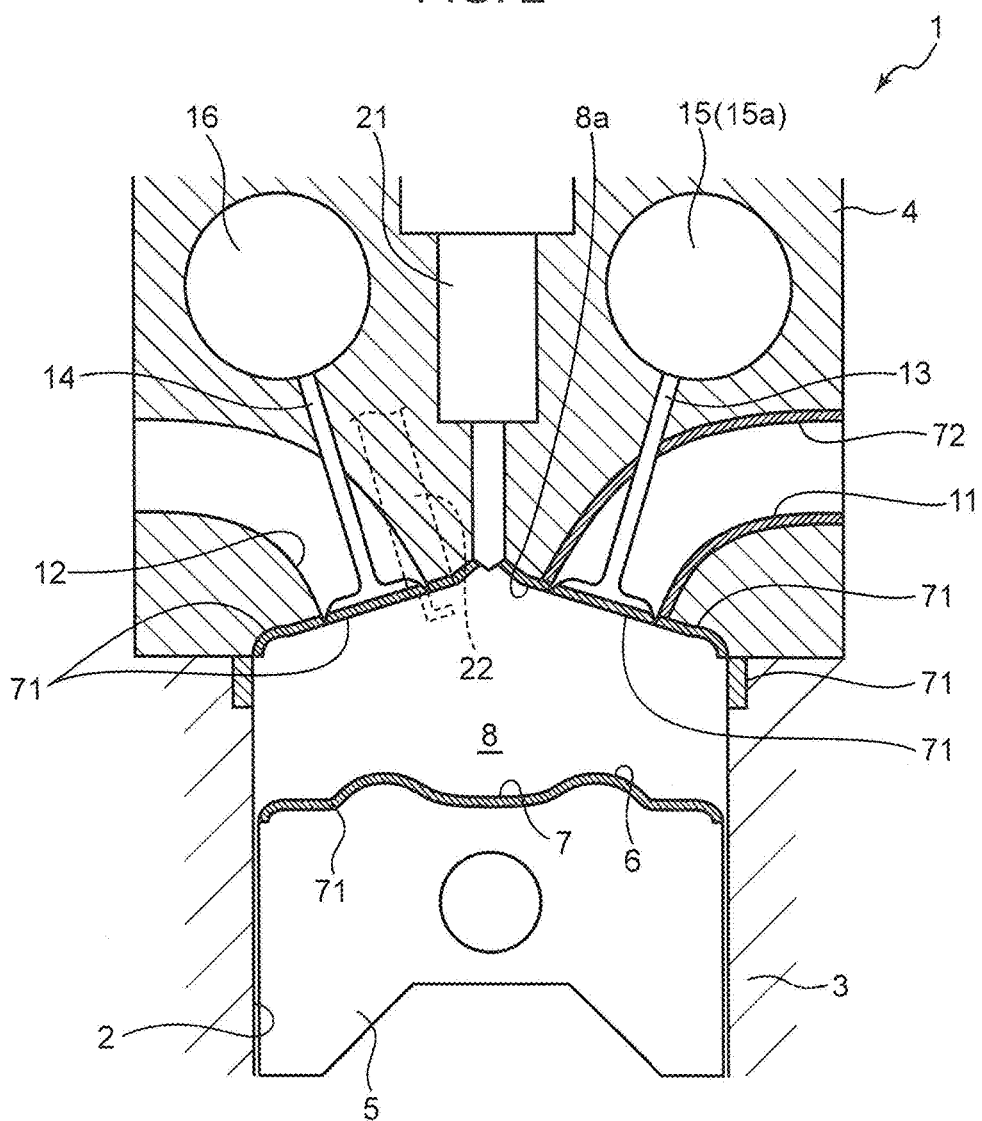
FIG. 2 is a schematic sectional view of an engine body.

FIG. 2 is a sectional view enlargedly illustrating a part of the engine body 1. In the following, an up-down direction illustrated in FIG. 2 is simply referred to as an up-down direction, and an upper side in FIG. 2 and a lower side in FIG. 2 are simply referred to as an upper side and a lower side.

As illustrated in FIG. 2, the engine body 1 includes a cylinder block 3 in which the cylinders 2 are formed, a cylinder head 4 formed on an upper surface of the cylinder block 3, and pistons 5, each of which is mounted in the cylinder 2 to be reciprocally movable.

A combustion chamber 8 is formed above the piston 5. Specifically, the combustion chamber 8 is defined by a wall surface (an inner surface) of the cylinder 2, a crown surface 6 of the piston 5, and a lower surface of the cylinder head 4. The combustion chamber 8 is of a so-called pent roof type, in which the combustion chamber 8 is upwardly inclined from the outer periphery thereof toward the center thereof. A ceiling surface 8a of the combustion chamber 8 (a lower surface of the cylinder head 4) has a shape of a triangle roof constituted by two inclined surfaces i.e. a surface on the intake side where an intake valve 13 to be described is mounted, and a surface on the exhaust side where an exhaust valve 14 to be described is mounted.

A downwardly projecting cavity 7 is formed in an area of the crown surface 6 of the piston 5 including a center portion thereof. More specifically, an upwardly bulging portion is formed on the crown surface 6 of the piston 5 in such a manner that the bulging portion surrounds the center portion of the crown surface 6 of the piston 5. The cavity 7 is defined inside the bulging portion. The cavity 7 is formed to have a volume occupying a large portion of the combustion chamber 8 when the piston 5 is lifted to the top dead center. An outer peripheral portion of the crown surface 6 of the piston 5 with respect to the bulging portion, namely, an outer peripheral portion with respect to the cavity 7 extends generally along the ceiling surface 8a of the combustion chamber 8 when the piston 5 is lifted to the top dead center.

In the embodiment, a geometric compression ratio of the engine body 1, in other words, a ratio between a volume of the combustion chamber 8 in a case where the piston 5 reaches the bottom dead center, and a volume of the combustion chamber 8 in a case where the piston 5 reaches the top dead center is set not smaller than 17 but not larger than 35 (e.g. about 25).

An intake port 11 for introducing air to be supplied from the intake passage 30 to the cylinder 2, and an exhaust port 12 for discharging combustion gas generated in the cylinder 2 to the exhaust passage 40 are formed in the cylinder head 4. Each of the intake port 11 and the exhaust port 12 is opened in the ceiling surface 8a of the combustion chamber 8. Opening portions of the intake port 11 and the exhaust port 12 are respectively opened and closed by the intake valve 13 and the exhaust valve 14. Specifically, the cylinder head 4 includes the intake valve 13 configured to open and close an opening portion of the intake port 11 formed in the ceiling surface 8a of the combustion chamber 8, and the exhaust valve 14 configured to open and close an opening portion of the exhaust port 12 formed in the ceiling surface 8a of the combustion chamber 8.

Figure 3:
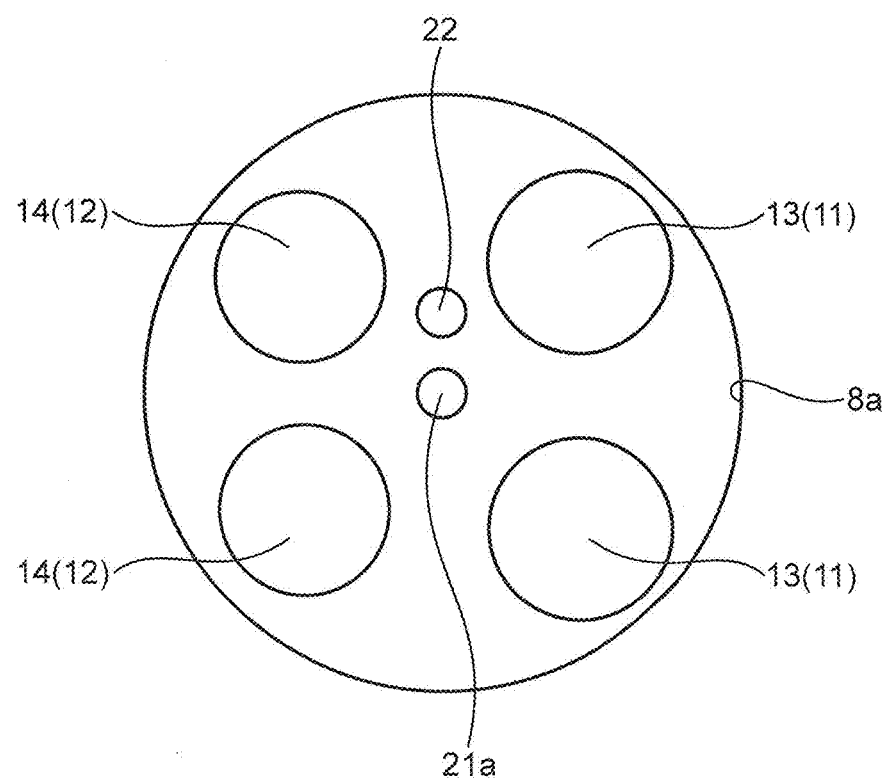
FIG. 3 is a schematic plan view of a ceiling surface of a combustion chamber.

In the embodiment, each two intake ports 11 and each two exhaust ports 12 are formed with respect to one cylinder 2. As illustrated in FIG. 3 (a schematic plan view of the ceiling surface 8a of the combustion chamber 8), each two intake ports 11 and each two exhaust ports 12 are opened in the ceiling surface 8a of the combustion chamber 8. Further, each two intake valves 13 and each two exhaust valves 14 are formed with respect to one cylinder 2. Furthermore, the intake valves 13 and the exhaust valves 14 (opening portions of the intake ports 11 and opening portions of the exhaust ports 12) are formed in portions of the ceiling surface 8a of the combustion chamber 8 facing each other with respect to a straight line passing through the center of the ceiling surface 8a. In the example illustrated in FIG. 3, the area of an opening portion of the intake port 11, namely, the area of a valve head of the intake valve 13, and the area of an opening portion of the exhaust port 12, namely, the area of a valve head of the exhaust valve 14 are different from each other.

As illustrated in FIG. 2, the intake port 11 is a so-called tumble port, and is gradually curved from the ceiling surface 8a of the combustion chamber 8 upwardly and radially outwardly of the combustion chamber 8. More specifically, the intake port 11 is formed to have a shape such that the centerline of the intake port 11 is substantially at a right angle (about 85° to about 95°) with respect to the ceiling surface 8a of the combustion chamber 8.

The intake valve 13 is opened and closed by an intake valve opening/closing mechanism (an intake valve driving device) 15. The intake valve opening/closing mechanism 15 includes an intake valve opening/closing timing changing mechanism 15a capable of changing an opening/closing timing of the intake valve 13 to change an opening timing and a closing timing of the intake valve 13 according to an operating condition or the like. In the embodiment, an opening/closing timing of the intake valve 13 is changed in a state that an opening period of the intake valve 13 is kept unchanged.

In the embodiment, a heat insulating member 71 of a low thermal conductivity is formed on top of a wall surface (an inner surface) of the combustion chamber 8 to reduce cooling loss by suppressing heat of combustion gas within the combustion chamber 8 from being released to the outside of the combustion chamber 8. Specifically, the heat insulating member 71 is formed on an upper end of an inner surface of the cylinder 2, the crown surface 6 of the piston 5, the ceiling surface 8a of the combustion chamber 8, and a valve head of each of the intake valve 13 and the exhaust valve 14. Note that the heat insulating member 71 formed on a wall surface of the cylinder 2 is formed only in an area on the upper side with respect to a piston ring in a state that the piston 5 reaches the top dead center so that the piston ring does not slide over the heat insulating member 71.

As far as the heat insulating member 71 is made of a material having a low thermal conductivity as described above, the material for the heat insulating member 71 is not specifically limited. Note that, however, it is preferable to use a material having a smaller volumetric specific heat than that of a wall surface of the combustion chamber 8, as a material for the heat insulating member 71. Specifically, in a case where the engine body 1 is cooled by cooling water, the temperature of gas within the combustion chamber 8 changes as a combustion cycle progresses, but the temperature of a wall surface of the combustion chamber 8 is substantially kept unchanged. As a result, cooling loss may increase accompanied by the temperature difference. In view of the above, forming the heat insulating member 71 of a material having a small volumetric specific heat is advantageous in reducing cooling loss, because the temperature of the heat insulating member 71 changes as the temperature of gas within the combustion chamber 8 changes.

For instance, the heat insulating member 71 is formed by coating a ceramic material such as $ZrO_2$ on a wall surface of the combustion chamber 8 by plasma spraying. Note that the thermal conductivity and the volumetric specific heat of the heat insulating member 71 may be further reduced by containing multitudes of pores in the ceramic material. Further, in the example illustrated in FIG. 2, a heat insulating layer 72 is additionally formed on an inner surface of the intake port 11.

The cylinder head 4 further includes a fuel injection valve 21 configured to inject fuel into the combustion chamber 8, and a spark plug 22 (see FIG. 3) configured to ignite a fuel-air mixture formed in the combustion chamber 8.

As illustrated in FIG. 2 and FIG. 3, the fuel injection valve 21 is disposed in such a manner that a distal end thereof (an end of the fuel injection valve 21 on the side of the combustion chamber 8) is located at the center of the ceiling surface 8a of the combustion chamber 8 and faces substantially the center of the cavity 7. On the other hand, the spark plug 22 is disposed in such a manner that a distal end thereof is disposed laterally of the fuel injection valve 21 and between the intake valve 13 and the exhaust valve 14.

The fuel injection valve 21 injects fuel fed by an unillustrated fuel pump into the combustion chamber 8. In the embodiment, the fuel injection valve 21 employs an outwardly opening valve.

Figure 4:
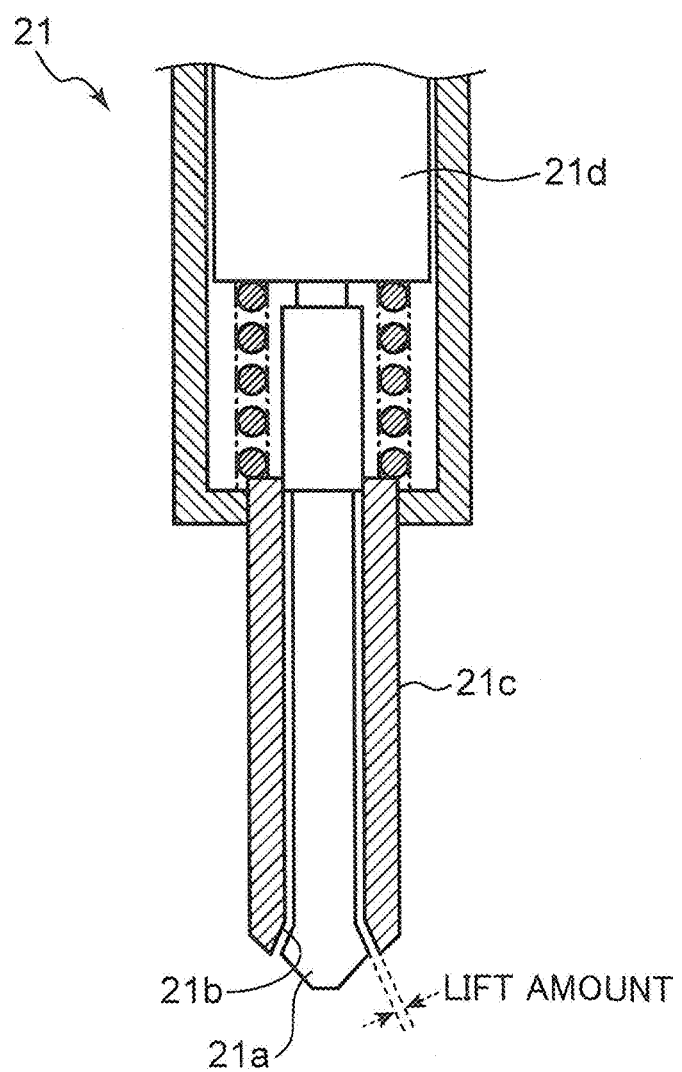
FIG. 4 is a schematic sectional view of a fuel injection valve.

FIG. 4 is a schematic sectional view of the fuel injection valve 21. As illustrated in FIG. 4, the fuel injection valve 21 includes a fuel pipe 21c with a nozzle opening 21b formed in a distal end of the fuel pipe 21c (an end of the fuel pipe 21c on the side of the combustion chamber 8), and an outwardly opening valve 21a disposed on the inner side of the fuel pipe 21c and configured to open and close the nozzle opening 21b. As described above, the fuel injection valve 21 is disposed in such a manner that a distal end thereof i.e. the nozzle opening 21b faces the center of the cavity 7, and in a posture that center axes of the nozzle opening 21b and the fuel pipe 21c extend in parallel to a center axis of the cylinder 2. The outwardly opening valve 21a is connected to a piezo element 21d, which is configured to deform depending on an applied voltage. The outwardly opening valve 21a comes into contact with the nozzle opening 21b in a state that a voltage is not applied to the piezo element 21d to close the nozzle opening 21b. Further, the piezo element 21d is deformed by application of a voltage thereto, and projects toward a distal end thereof through the nozzle opening 21b to open the nozzle opening 21b.

The nozzle opening 21b, and a portion of the outwardly opening valve 21a in contact with the nozzle opening 21b have a tapered shape such that the diameter increases toward a distal end thereof. Fuel is injected through the nozzle opening 21b in the shape of a cone (specifically, a hollow cone shape) in a state that a center axis of the nozzle opening 21b, namely, a center axis of the cylinder 2 is generally defined as a center. For instance, the tapered angle of the cone shape is from 90° to 100° (the tapered angle of a hollow portion inside the hollow cone is about 70°).

In this example, an opening period and a lift amount of the outwardly opening valve 21a (the lift amount is a projection amount of the outwardly opening valve 21a from a closing position, and is an opening amount of the nozzle opening 21b) change depending on a voltage application period and a magnitude of voltage to be applied to the piezo element 21d. Further, penetration of fuel injected from the nozzle opening 21b, the fuel amount to be injected per unit time, and the particle diameter of injected fuel change depending on a lift amount of the outwardly opening valve 21a. Specifically, as the lift amount increases and the opening amount of the nozzle opening 21b increases, penetration of injected fuel increases, the fuel injection amount per unit time increases, and the particle diameter of injected fuel increases.

According to the aforementioned configuration, the fuel injection valve 21 is capable of performing multi-stage injection of about twenty times at an interval of from 1 to 2 msec. Further, the fuel injection valve 21 is capable of controlling fuel injection in a radial direction (a direction orthogonal to center axes of the nozzle opening 21b and the fuel pipe 21*c*), and fuel injection in an axis direction (a direction aligned with center axes of the nozzle opening 21*b* and the fuel pipe 21*c*) independently of each other by individually changing a fuel injection interval and a lift amount of the outwardly opening valve 21*a*.

For instance, shortening a fuel injection interval makes it possible to accelerate fuel injection in an axis direction. Specifically, in a case where a fuel injection interval is short, a negative pressure area is continuously formed on the inner side of a hollow cone, and a negative pressure area having a long size in an axis direction is formed. Therefore, in a case where a fuel injection interval is short, fuel injection easily spreads in an axis direction by attraction of fuel toward the negative pressure area.

On the other hand, in a case where a lift amount of the fuel injection valve 21 increases, fuel injection in a radial direction is accelerated. Specifically, in a case where a lift amount is large, the particle diameter of fuel injection increases as described above, and kinetic momentum of fuel injection increases. Therefore, in a case where a lift amount is large, fuel injection is less likely to be attracted toward a negative pressure area, and fuel injection spreads radially outwardly.

(3) Control System (3-1) System Configuration

Figure 5:
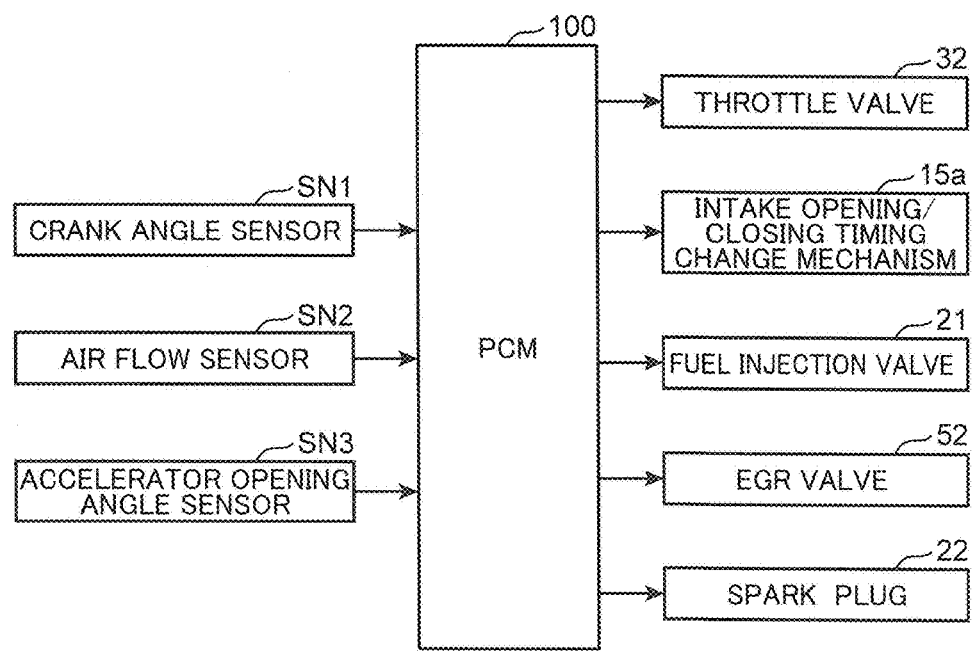
FIG. 5 is a block diagram illustrating a control system of an engine.

FIG. 5 is a block diagram illustrating a control system of the engine. As illustrated in FIG. 5, an engine system of the embodiment is integrally controlled by a PCM (Power Train Control Module, in other words, a control device including various control units) 100. As is well known, the PCM 100 is a microprocessor constituted by a CPU, an ROM, and an RAM. The PCM 100 corresponds to an injection control unit and a valve control unit in the claims.

The PCM 100 is electrically connected to various sensors for detecting an operating condition of the engine.

For instance, a crank angle sensor SN1 configured to detect a rotation angle of a crankshaft, and a rotation speed of an engine i.e. an engine speed is provided in the cylinder block 3. Further, an airflow sensor SN2 configured to detect an amount of air (an amount of fresh air) passing through the air cleaner 31 and drawn into each cylinder 2 is provided in the intake passage 30. Further, an accelerator opening angle sensor SN3 configured to detect an opening angle (an accelerator opening angle) of an unillustrated accelerator pedal to be operated by a driver is provided in a vehicle.

The PCM 100 controls the respective parts of the engine, while executing various determinations and calculations based on input signals from the various sensors. Specifically, the PCM 100 is electrically connected to the throttle valve 32, the intake opening/closing timing changing mechanism 15*a*, the fuel injection valve 21, the EGR valve 52, and the spark plug 22; and outputs control signals for driving to these devices respectively based on the calculation result or the like.

Figure 6:
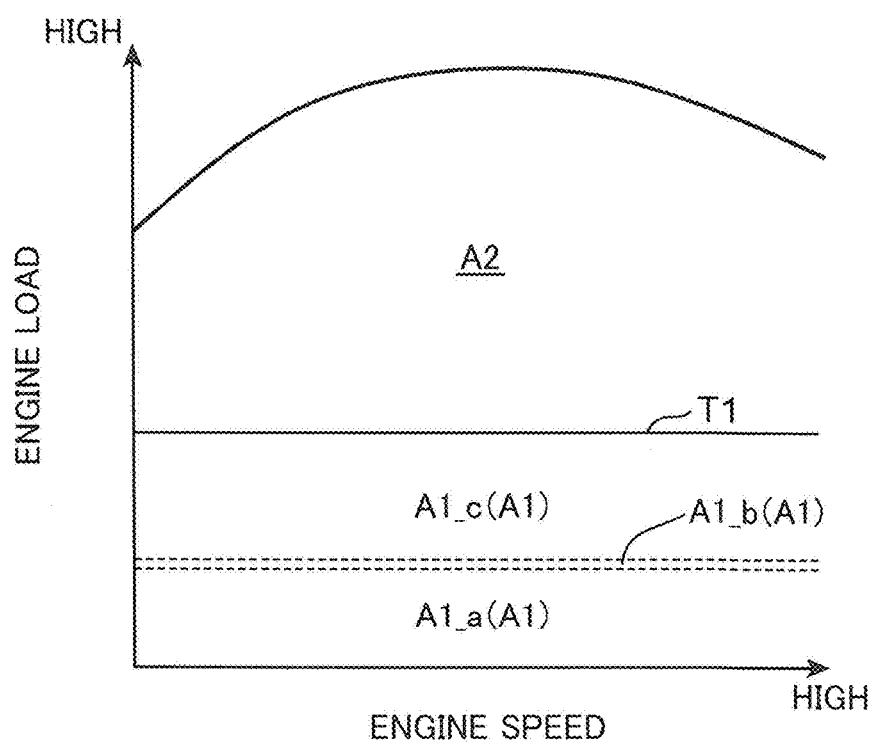
FIG. 6 is a diagram illustrating an operating range of the engine.

Specifically, the PCM 100 calculates a fuel injection amount according to an engine load request value, which is obtained from an accelerator opening angle, an engine speed, and the like; and causes the fuel injection valve 21 to inject fuel by the calculated fuel injection amount. Further, the PCM 100 changes an injection mode according to an operating range illustrated in FIG. 6. FIG. 6 illustrates a map, in which the horizontal axis denotes an engine speed, and the vertical axis denotes an engine load. In the embodiment, an operating range is divided into a low load range A1 where the engine load is lower than a predetermined set reference load T1, and a high load range A2 where the engine load is equal to or higher than the reference load T1. Further, the low load range A1 is divided into a first range A1_*a*, a second range A1_*c*, and a switching range A1_*b* depending on an engine load. The control content of each range is described in the following.

(3-2) Low Load Range

In the low load range A1, homogeneous charge compression ignition combustion is performed, in which fuel and air are mixed in advance to a fuel-air mixture, and the fuel-air mixture is caused to ignite in the vicinity of a compression top dead center (TDC). Therefore, in the low load range A1, driving of the spark plug 22 is stopped.

Further, in the low load range A1, a closing timing of the intake valve 13 is controlled to be on a retard side with respect to an intake bottom dead center so as to reduce cooling loss.

Specifically, setting a closing timing of the intake valve 13 to a more retarded side makes it possible to shorten a period after the intake valve 13 is closed until the compression top dead center, in other words, a period during which intake air is compressed. Further, it is possible to shorten a period during which high-temperature intake air accompanied by compression comes into contact with a wall surface of the cylinder 2 (a wall surface of the combustion chamber 8). Therefore, setting a closing timing of the intake valve 13 on a more retarded side makes it possible to suppress heat energy of high-temperature intake air, which is released to the outside via a wall surface of the cylinder 2 accompanied by the contact as described above. In view of the above, in the low load range A1, as described above, a closing timing of the intake valve 13 is controlled to be a timing on a retard side with respect to the intake bottom dead center by the intake opening/closing timing changing mechanism 15*a*. In this example, setting a closing timing of the intake valve 13 on a retard side with respect to the intake bottom dead center makes it possible to reduce pumping loss, and to enhance energy efficiency. Note that in a case where a closing timing of the intake valve 13 is on a retard side with respect to the intake bottom dead center, an effective compression ratio is reduced. However, the low load range A1 is a range where the engine load is small. Therefore, it is possible to secure an engine output as requested, even in a case where the effective compression ratio is reduced.

Figure 7:
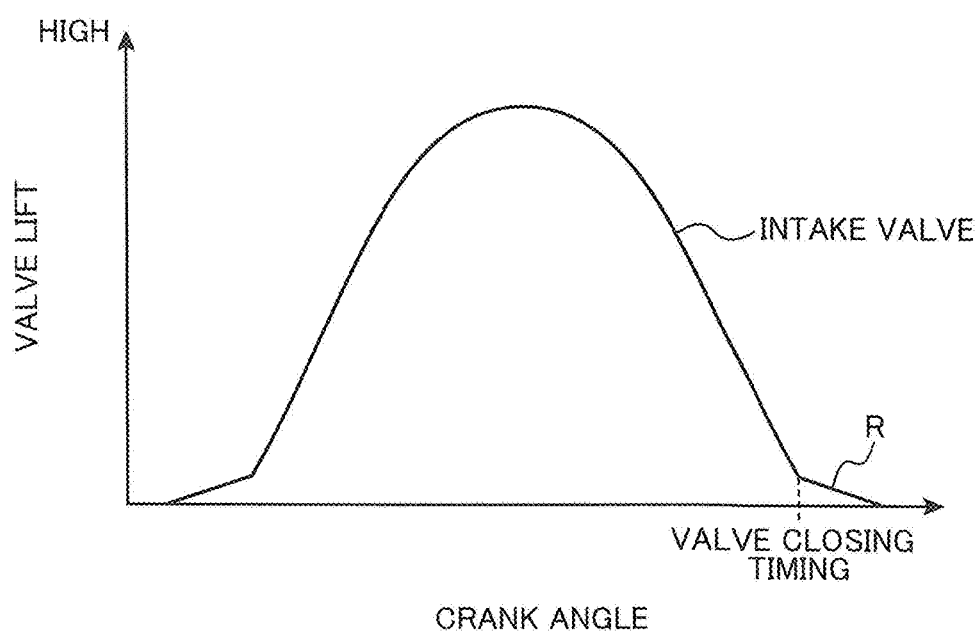
FIG. 7 is a diagram illustrating a valve lift of an intake valve for describing a closing timing of the intake valve.

Note that as illustrated in FIG. 7, a closing timing of the intake valve 13 is a timing (a timing in terms of a crank angle) at which the lift amount of the intake valve 13 is maximized, and thereafter is minimized except for a ramp portion R, and is a timing at which intake flow into the cylinder 2 is substantially stopped. For instance, a closing timing of the intake valve 13 is a timing at which the lift amount of the intake valve 13 is lowered to 0.4 mm or less.

Further, in the low load range A1, the calorific value of a fuel-air mixture is small, and the combustion temperature is relatively low. Therefore, it is possible to reduce the amount of NOx (so called raw NOx) generated by combustion. Accordingly, in the low load range A1, it is not necessary to purify NOx by a three-way catalyst, and it is not necessary to set the air-fuel ratio to a stoichiometric air-fuel ratio capable of purifying NOx by the three-way catalyst. In view of the above, in the low load range A1, the air-fuel ratio of a fuel-air mixture is controlled to be in a lean range i.e. the excess air ratio $\lambda > 1$ in order to enhance fuel economy.

Further, in the low load range A1, EGR gas is returned to the cylinder 2. Specifically, in the low load range A1, the EGR valve 52 is opened, and a part of exhaust gas within the exhaust passage 40 is returned to the intake passage 30 as EGR gas.

In the embodiment, in the low load range A1, EGR gas is returned in such a manner that G/F, which is a ratio of a total gas weight within the combustion chamber 8 with respect to a fuel amount, is equal to or more than 35. Further, the EGR ratio (a ratio of the EGR gas weight with respect to the total gas weight within the cylinder 2) is increased, as the engine load increases.

Further, in the low load range A1, in the latter half of a compression stroke (during a period from 90°) CA before compression top dead center to compression top dead center), the total amount of fuel (the total amount of fuel to be injected per combustion cycle) is injected from the fuel injection valve 21. For instance, the total amount of fuel is injected into the combustion chamber 8 in the vicinity of 30° CA before compression top dead center.

Figure 8:
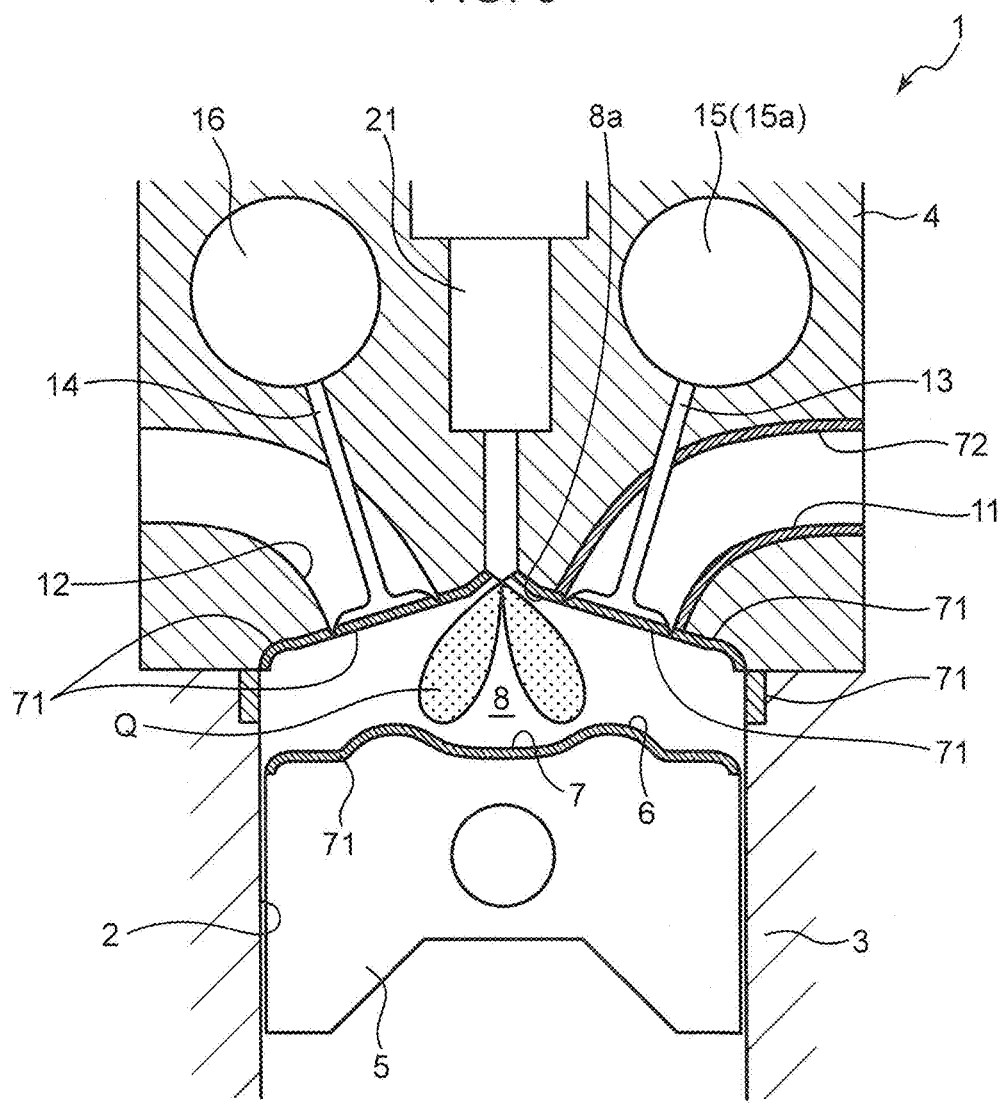
FIG. 8 is a diagram schematically illustrating a fuel-air mixture formed within a combustion chamber.

As described above, by injecting the total amount of fuel in the latter half of a compression stroke, as illustrated in FIG. 8, in the low load range A1, a fuel-air mixture Q whose fuel concentration is high is formed in a middle portion of the combustion chamber 8 in the vicinity of a compression top dead center, specifically, immediately before start of combustion of a fuel-air mixture within the combustion chamber 8. Specifically, a stratified fuel-air mixture whose fuel concentration is high in a middle portion of the combustion chamber 8, and whose fuel concentration is low in an outer peripheral portion of the combustion chamber 8 is formed within the combustion chamber 8. Note that an outer peripheral potion of the combustion chamber 8 means vicinities of a top of the crown surface 6 of the piston 5 (a surface of the heat insulating member 71 formed on the crown surface 6), a wall surface of the cylinder 2 (a surface of the heat insulating member 71 on a wall surface), and the ceiling surface 8a of the combustion chamber 8.

In the embodiment, an injection mode is switched depending on an engine load in such a manner that a gas layer substantially devoid of fuel (hereinafter, also referred to as a non combustion gas layer, as necessary) is formed in an outer peripheral portion of the combustion chamber 8, in other words, the fuel concentration in an outer peripheral portion of the combustion chamber 8 becomes substantially zero immediately before start of combustion of a fuel-air mixture.

Figure 9C:
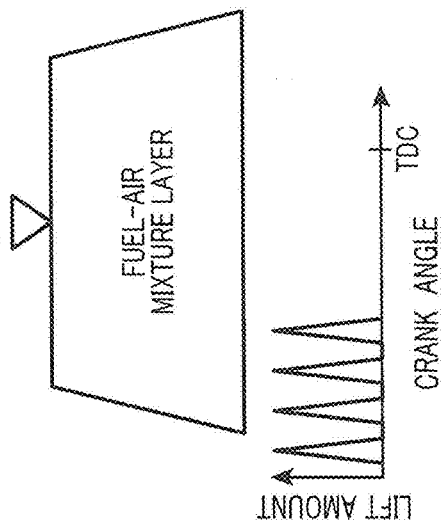
Figure 9B:
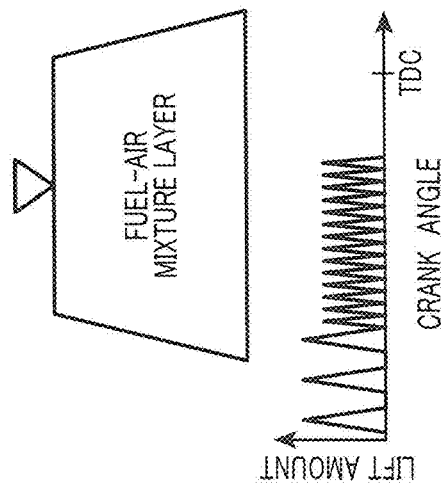
Figure 9A:
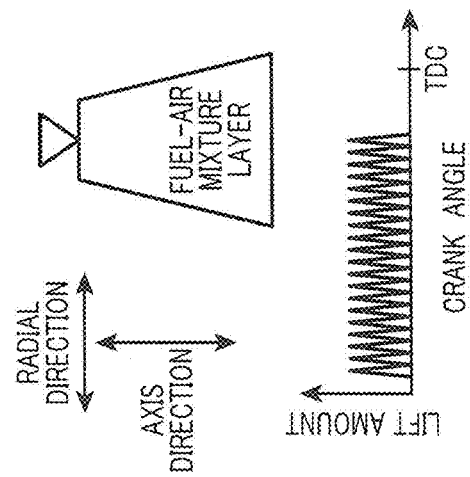
Figure 11:
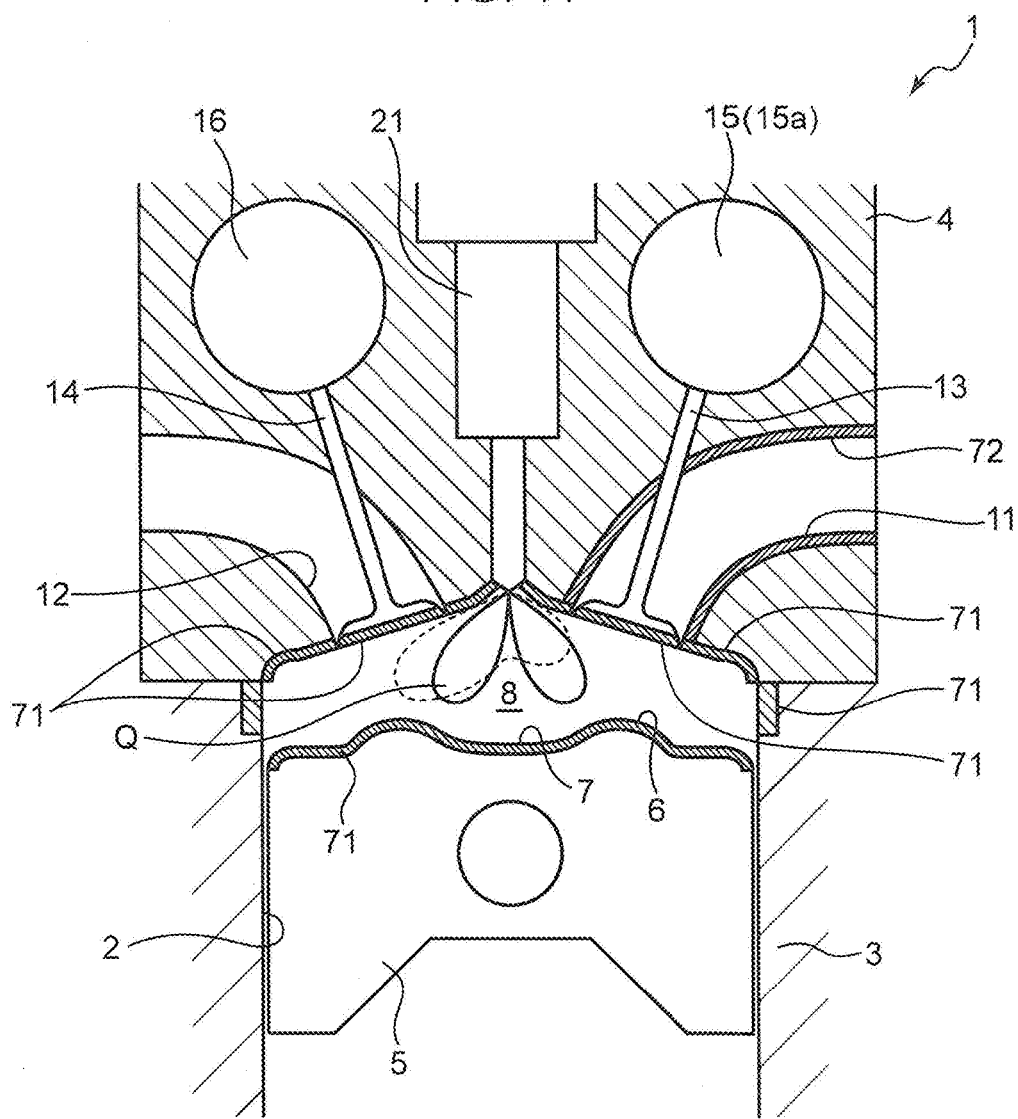
FIG. 11 is a diagram for describing a relationship between a closing timing of an intake valve, and a distribution of a fuel-air mixture.

Specifically, out of the low load range A1, injections modes in a first range A1_a where the engine load is significantly low, in a second range A1_c where the engine load is higher than the engine load in the first range A1_a, and in a switching range A1_b between the first range A1_a and the second range A1_c are a first injection mode, a second injection mode, and a switching range injection mode respectively illustrated in FIG. 9A, FIG. 9B, and FIG. 9C. In the following, the respective injection modes are described in detail.

FIG. 9A illustrates the first injection mode to be performed in the first range A1_a where the engine load is significantly low in the low load range A1. In the first injection mode, injection whose lift amount of the fuel injection valve 21 is small, and whose injection interval is short is continually performed a plurality of times. Note that the number of times of injection is not limited to the example illustrated in FIG. 9A, and may be changed as necessary.

As described above, in a case where the injection interval is short, the length of fuel injection is long in an axis direction. Further, in a case where the lift amount is small, radially outwardly spreading of fuel injection is suppressed. Therefore, in the first injection mode, fuel injection and a fuel-air mixture have a longitudinally elongated shape, whose length in an axis direction is relatively long as compared with the length in a radial direction. Note that in the first range A1_a, the engine load is particularly low, and the fuel injection amount is small. Therefore, the fuel-air mixture has a short length in an axis direction while keeping a longitudinally elongated shape. This makes it possible to form a non combustion gas layer in an outer peripheral portion of the combustion chamber 8.

FIG. 9C illustrates the second injection mode to be performed in the second range A1_c. In the second injection mode, injection, whose lift amount of the fuel injection valve 21 is larger than that in the first injection mode, and whose injection interval is longer than that in the first injection mode, is performed continually a plurality of times. Note that the number of times of injection is not limited to the example illustrated in FIG. 9C, and may be changed as necessary.

As described above, in a case where the injection interval is long, the length of fuel injection is short in an axis direction. Further, in a case where the lift amount is large, fuel injection spreads radially outwardly. Therefore, in the second injection mode, fuel injection and a fuel-air mixture have a transversely elongated shape, whose length in a radial direction is relatively long as compared with the length in an axis direction. Note that the size of the combustion chamber 8 is longer in a radial direction than in an axis direction in the vicinity of compression top dead center, and there is room in space in a radial direction. Therefore, a fuel-air mixture does not reach a wall surface of the combustion chamber 8 even in a case where fuel injection and a fuel-air mixture have a transversely elongated shape. Thus, it is possible to form a non combustion gas layer in an outer peripheral portion of the combustion chamber 8.

FIG. 9B illustrates the switching range injection mode to be performed in the switching range A1_c. The switching range injection mode is a mode obtained by combining the first injection mode and the second injection mode. For instance, as illustrated in FIG. 9B, after injection in the second injection mode is performed (after injection whose lift amount is large and whose injection interval is long is performed continually a plurality of times), injection in the first injection mode is performed (injection whose lift amount is small and whose injection interval is short is performed continually a plurality of times). Note that, injection in the first injection mode may be performed, and thereafter, injection in the second injection mode may be performed, in place of the aforementioned operation. Further, the number of times of injection is not limited to the example illustrated in FIG. 9B, and may be changed as necessary.

In the switching range injection mode, by combining the first injection mode and the second injection mode, particularly, radially outwardly spreading of a fuel-air mixture layer is adjusted. As a result of the adjustment, a fuel-air mixture layer has a shape, whose length is long as compared with a fuel-air mixture layer in the first injection mode, and whose length is short as compared with a fuel-air mixture layer in the second injection mode. According to this configuration, in the switching range A1_b, as a boundary range between the first range A1_a and the second range A1_c, it is possible to appropriately adjust spreading of a fuel-air mixture in an axis direction and in a radial direction, and to form a non combustion gas layer in an outer peripheral portion of the combustion chamber 8.

Note that the switching range injection mode can be omitted. Further, in the embodiment, as described above, a surplus of air whose excess air ratio λ is larger than 1 and which does not contribute to combustion exists in the low load range A1. Therefore, even in a case where an air layer is formed in an outer peripheral portion of the combustion chamber 8 as described above, it is possible to secure an amount of air necessary for combustion in a middle portion of the combustion chamber 8, and to set the air-fuel ratio in the middle portion in an appropriate range.

As described above, in a case where the aforementioned injection modes are performed respectively in the ranges A1_a to A1_c of the low load range A1, basically, it is possible to form a non combustion gas layer in an outer peripheral portion of the combustion chamber 8, and to set the fuel concentration in the outer peripheral portion of the combustion chamber 8 to substantially zero. However, the inventors of the present application examined a distribution of a fuel-air mixture and combustion gas generated within the cylinder 2 in detail. As a result of the examination, the inventors found that there is a case, in which a non combustion gas layer is not appropriately formed in an outer peripheral portion of the combustion chamber 8 depending on an operating condition, even if the respective injection modes are performed. Specifically, the inventors found that in a case where a closing timing of the intake valve 13 is on a retard side with respect to an intake bottom dead center as described above, and in a case where the retard amount is relatively large and the engine speed is high, it may be difficult to appropriately form a non combustion gas layer in an outer peripheral portion of the combustion chamber 8.

This matter is described using FIGS. 10A to FIG. 10D, and FIG. 11. FIGS. 10A to FIG. 10D, and FIG. 11 are drawings schematically illustrating an intake flow within the cylinder 2 in a case where a closing timing of the intake valve 13 is relatively greatly retarded with respect to an intake bottom dead center, and the engine speed is high.

First of all, as illustrated in FIG. 10A, in a case where the piston 5 is lowered before the intake bottom dead center and in a state that the intake valve 13 is opened, intake air (gas containing air and EGR gas) flows into the cylinder 2 through the intake port 11. In this case, a tumble flow is generated within the cylinder 2. Specifically, within the cylinder 2, intake air flows downward while passing through a portion of the cylinder 2 close to the exhaust side toward the crown surface 6 of the piston 5 from the intake port 11, and flows upward while passing through a portion of the cylinder 2 on the intake side from the vicinity of the crown surface 6 of the piston 5.

Thereafter, when the piston 5 is started to be lifted over the intake bottom dead center, as illustrated in FIG. 10B, the upward flow of intake air within the cylinder 2 increases as the intake air is pushed by the piston 5. In this case, in a case where the intake valve 13 is opened, intake air within the cylinder 2 is forced to return to the intake port 11, and intake air within the cylinder 2 flows toward the intake valve 13. The flow of intake air toward the intake valve 13 increases, as the piston 5 is lifted upward, in other words, as the volume of the combustion chamber 8 decreases. Further, the flow of intake air increases, as the lifting speed of the piston 5 increases, in other words, as the engine speed increases.

When the intake valve 13 is closed in a state that the piston 5 is lifted to a certain level, and intake air vigorously flows toward the intake valve 13, as illustrated in FIG. 10C, intake air impinges against the intake valve 13, and is caused to flow toward the exhaust side along the ceiling surface 8a of the combustion chamber 8. Therefore, after intake air is directed from the crown surface 6 of the piston 5 toward the intake valve 13 within the cylinder 2, in other words, within the combustion chamber 8, there is generated a relatively strong intake flow toward the exhaust valve 14 along the ceiling surface 8a of the combustion chamber 8.

Therefore, as illustrated in FIG. 10D, in the vicinity of a compression top dead center, a flow of intake air from the intake side toward the exhaust side is stronger than a flow of intake air from the exhaust side toward the intake side. Specifically, in the vicinity of a compression top dead center, there is generated a so-called squish flow directed from a space between an outer peripheral portion of the crown surface 6 of the piston 5 and the ceiling surface 8a of the combustion chamber 8 toward the center of the combustion chamber 8. However, a flow of intake air along the ceiling surface 8a of the combustion chamber 8 joins the squish flow when the intake air flows from the intake side toward the exhaust side. Therefore, the flow from the intake side toward the exhaust side (a flow indicated by the solid line arrow in FIG. 10D) is stronger than the squish flow from the exhaust side toward the intake side (a flow indicated by the broken line arrow in FIG. 10D). Thus, a strong flow from the intake side toward the exhaust side is generated in the vicinity of the ceiling surface 8a within the combustion chamber 8.

Therefore, even in a case where the respective injection modes are performed before a compression top dead center, a fuel-air mixture may flow toward the exhaust side along the ceiling surface 8a of the combustion chamber 8 in the aforementioned state. Therefore, unlike a case where the fuel-air mixture Q is formed as indicated by the solid line in FIG. 11 (in a state that intake air hardly flows within the cylinder 2), a fuel-air mixture may be formed along the ceiling surface 8a of the combustion chamber 8 as indicated by the broken line in FIG. 11.

Figure 12:
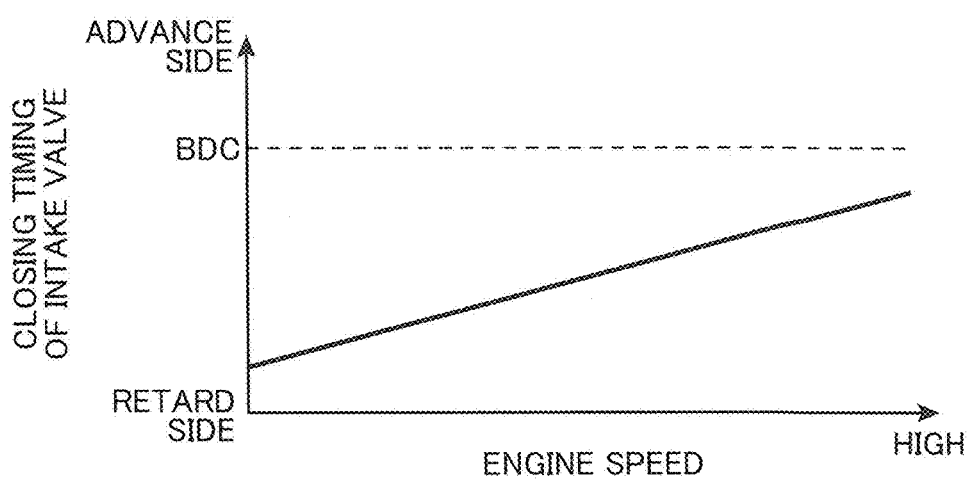
FIG. 12 is a diagram illustrating a relationship between a closing timing of an intake valve and an engine speed in a low load range.

In view of the above, in the embodiment, as illustrated in FIG. 12, in the low load range A1, a closing timing of the intake valve 13 is controlled to be advanced so that the closing timing of the intake valve 13 approaches the intake bottom dead center (BDC), as the engine speed increases.

Specifically, the intake valve 13 is closed at a timing at which the lift amount of the piston 5 is small and the flow of intake air toward the intake valve 13 is weakened, as the engine speed increases, i.e., as the lifting speed of the piston 5 increases, and accordingly, the flow of intake air within the cylinder 2 increases, in other words, as the flow of intake air toward the intake valve 13 increases in a state illustrated in FIG. 10B. The aforementioned configuration makes it possible to weaken the flow along the ceiling surface 8a of the combustion chamber 8, and makes it possible to appropriately form a fuel-air mixture in a middle portion of the combustion chamber 8 and to form a non combustion gas layer in an outer peripheral portion of the combustion chamber 8 (in the vicinity of the ceiling surface 8a of the combustion chamber 8).

Note that in the embodiment, in all the ranges of the low load range A1, a closing timing of the intake valve 13 is set to a timing at which intake air is blown back toward the intake port 11. Alternatively, a closing timing of the intake valve 13 may be set to a timing at which intake air is blown back toward the intake port 11 in a range where the engine speed is low in the low load range A1, and a closing timing of the intake valve 13 may be set to a timing at which there is no intake air blowback in a range where the engine speed is high in the low load range A1.

FIGS. 13A to 13D are diagrams schematically illustrating an intake flow within the cylinder 2 in a case where a closing timing of the intake valve 13 is advanced, as compared with the configuration illustrated in FIGS. 10A to 10D. As illustrated in FIGS. 13B and 13C, even in a case where a tumble flow is generated within the cylinder 2 as the piston 5 is lowered (see FIG. 13A), closing the intake valve 13 at an early timing after the piston 5 starts to be lifted makes it possible to weaken the flow of intake air toward the intake valve 13, and to cause intake air to gradually flow toward the vicinity of the center of the ceiling surface 8a of the combustion chamber 8. Therefore, as illustrated in FIG. 13D, it is possible to reduce a difference between a flow of intake air from the intake side toward the exhaust side, and a flow of intake air from the exhaust side toward the intake side in the vicinity of a compression top dead center, and to weaken the flow along the ceiling surface 8a of the combustion chamber 8.

(3-3) High Load Range

Control in the high load range A2 is briefly described.

In the high load range A2, fuel is injected in a period from the latter half of a compression stroke to the initial stage of an expansion stroke so that combustion is started in a state that a fuel-air mixture within the combustion chamber 8 is more homogenized (a state that the air-fuel ratio within the combustion chamber 8 is made uniform) so as to suppress deterioration of smoke emission, and a fuel-air mixture formed in the entirety of the combustion chamber 8 is ignited, whereby combustion is started.

Further, in the high load range A2, the air-fuel ratio is set to a stoichiometric air-fuel ratio so as to perform NOx purification by a three-way catalyst. Specifically, the excess air ratio $\lambda$ is set to 1. Further, in the high load range A2, the EGR valve 52 is closed from a fully opened state so that returning of EGR gas is reduced or stopped, and G/F is set to a value smaller than 35.

(4) Advantageous Effects

As described above, in the embodiment, in the low load range A1, fuel is injected in such a manner that a fuel-air mixture, whose fuel concentration in a middle portion of the combustion chamber 8 is higher than a fuel concentration in an outer peripheral portion of the combustion chamber 8, is formed within the combustion chamber 8. This makes it possible to reduce the amount of combustion gas generated in the vicinity of a wall surface of the combustion chamber 8. In particular, in the embodiment, fuel is injected a plurality of times before a compression top dead center. This makes it possible to form a non combustion gas layer substantially devoid of fuel in the vicinity of a wall surface of the combustion chamber 8, and to combust a fuel-air mixture in this state. Therefore, it is possible to avoid contact between combustion gas and a wall surface of the combustion chamber 8 by the existence of a non-combustion gas layer, and to suppress an increase in heat energy of combustion gas, which is released to the outside from a wall surface of the combustion chamber 8, in other words, to suppress an increase in cooling loss, whereby it is possible to enhance fuel economy.

Further, in the low load range A1, a closing timing of the intake valve 13 is retarded with respect to an intake bottom dead center, and is advanced as the engine speed increases. This is advantageous in securely enhancing fuel economy.

Specifically, as described above, retarding a closing timing of the intake valve 13 with respect to an intake bottom dead center makes it possible to shorten a period during which intake air is compressed, to reduce heat energy of high-temperature intake air accompanied by compression, which is released to the outside via a wall surface of the combustion chamber 8, and to reduce pumping loss.

Further, as described above, advancing a closing timing of the intake valve 13 in a range where the engine speed is high makes it possible to weaken the flow of gas toward the intake port 11 after the intake valve 13 is closed, consequently, to weaken the flow of gas along the ceiling surface 8a of the combustion chamber 8 in the vicinity of a compression top dead center, and to securely reduce cooling loss by avoiding contact between combustion gas and the ceiling surface 8a of the combustion chamber 8. In particular, in the embodiment, weakening the flow of gas along the ceiling surface 8a of the combustion chamber 8 is advantageous in securely forming a non combustion gas layer in an outer peripheral portion of the combustion chamber 8, and in effectively reducing cooling loss.

FIGS. 14A and 14B illustrate a result of numerical analysis of an intake flow within the combustion chamber 8 in a case where the engine speed is 3,000 rpm.

FIG. 14A illustrates a result in a case where control according to the embodiment is performed. Specifically, FIG. 14A illustrates a result in a case where a closing timing of the intake valve 13 is set to ABDC (after intake bottom dead center) 60° CA. Further, FIG. 14A illustrates a result in a case where a closing timing of the intake valve 13 is set to ABDC 50° CA, in other words, BTDC (before compression top dead center) 130° CA, ABDC 80° CA, in other words, BTDC 100° CA, and ABDC 152° CA, in other words, BTDC 28° CA in this order from the upper side.

On the other hand, FIG. 14B illustrates a result of a comparative example, in a case where a closing timing of the intake valve 13 is set to the same timing as the closing timing of the intake valve 13 in a case where the engine speed is 2,000 rpm. Specifically, FIG. 14B illustrates a result in a case where a closing timing of the intake valve 13 is set to ABDC 80° CA. Further, FIG. 14B illustrates a result in a case where a closing timing of the intake valve 13 is set to ABDC 50° CA, in other words, BTDC (before compression top dead center) 130° CA, ABDC 80° CA, in other words, BTDC 100° CA, and ABDC 152° CA, in other words, BTDC 28° CA in this order from the upper side. Note that in FIGS. 14A and 14B, a brighter portion indicates that the flow of gas is strong. Further, in each of FIGS. 14A and 14B, the lowermost diagram enlargedly illustrates the combustion chamber 8.

Figure 15A:
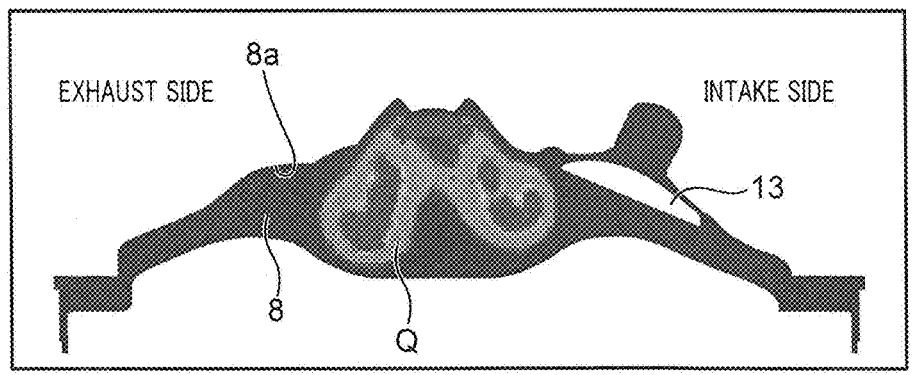
Figure 15B:
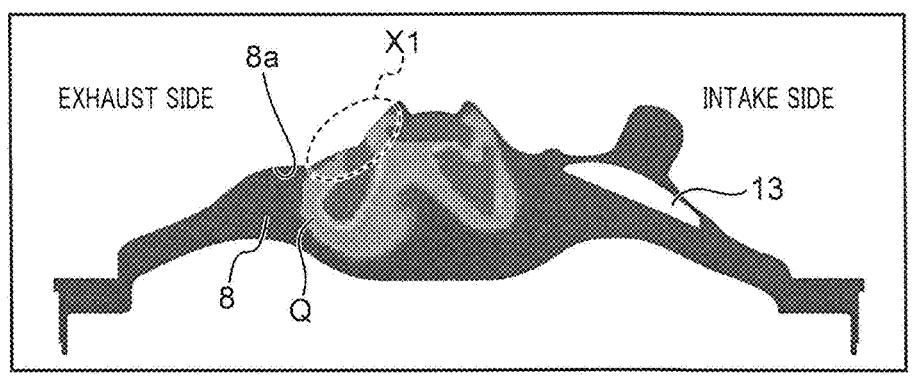

Further, FIGS. 15A and 15B are diagrams respectively corresponding to FIGS. 14A and 14B. FIG. 15A illustrates a temperature distribution (a result of numerical analysis) within the combustion chamber 8 immediately after combustion of a fuel-air mixture is started (BTDC 15° CA) in a case where control according to the embodiment is performed. FIG. 15B illustrates a temperature distribution (a result of numerical analysis) within the combustion chamber 8 immediately after combustion of a fuel-air mixture is started (BTDC 15° CA) in a comparative example. Note that FIGS. 15A and 15B are sectional views, in which the right side corresponds to the intake side, and the left side corresponds to the exhaust side.

As illustrated in FIG. 14B, in the comparative example, intake air within the cylinder 2 vigorously flows toward the intake valve 13 immediately before the intake valve 13 is closed. Further, as a result, intake air from the intake side toward the exhaust side also vigorously flows in the vicinity of a compression top dead center. Further, as illustrated in FIG. 15B, as intake air vigorously flows, combustion gas flows along the ceiling surface 8a of the combustion chamber 8 in an area indicated by the symbol X1, and comes into contact with the ceiling surface 8a of the combustion chamber 8.

On the other hand, as illustrated in FIG. 14A, in the embodiment, a flow of gas toward a middle portion of the ceiling surface 8a of the combustion chamber 8 is formed within the cylinder 2 after the intake valve 13 is closed, and the flow from the intake side toward the exhaust side is weakened in the vicinity of a compression top dead center. Further, as illustrated in FIG. 15A, as the flow is weakened, contact of high-temperature combustion gas with the ceiling surface 8a of the combustion chamber 8 is avoided.

In this way, in the embodiment, advancing a closing timing of the intake valve 13 as the engine speed increases makes it possible to avoid contact of high-temperature combustion gas with the ceiling surface 8a of the combustion chamber 8 to thereby reduce cooling loss.

(5) Modifications

In the embodiment, there is described a case where a closing timing of the intake valve 13 is advanced, as the engine speed increases in the low load range A1. As far as a closing timing of the intake valve 13 is controlled to be advanced as the engine speed increases, a closing timing of the intake valve 13 may be stepwise changed depending on the engine speed.

Further, in the embodiment, there is described a case where fuel is injected in the injection modes illustrated in FIGS. 9A to 9C in the low load range A1. However, a specific injection pattern is not limited to the above, as far as fuel is injected in the latter half of a compression stroke in the low load range A1 in such a manner that the fuel concentration within the combustion chamber 8 immediately before start of combustion is higher in a middle portion of the combustion chamber 8 than in a outer peripheral portion of the combustion chamber 8. Note that, however, causing fuel to be injected a plurality of times in the latter half of a compression stroke makes it possible to shorten a fuel spray distance, and to securely stratify the fuel. Further, setting the injection modes illustrated in FIGS. 9A to 9C is advantageous in forming a non combustion gas layer in an outer peripheral portion of the combustion chamber 8, and in securely reducing cooling loss.

Further, the heat insulating member 71 may be omitted. Note that, however, forming the heat insulating member 71 is advantageous in reducing cooling loss.

Further, fuel that does not contain gasoline may be used as the fuel.

As described above, a direct injection engine according to the present invention is a direct injection engine provided with a cylinder including a combustion chamber in which a piston is mounted to be reciprocally movable. The direct injection engine includes an intake port opened in a ceiling surface of the combustion chamber, and configured to introduce intake air to the cylinder; an intake valve configured to open and close an opening portion of the intake port; a fuel injection valve mounted on the ceiling surface of the combustion chamber, and configured to inject fuel toward a crown surface of the piston; an intake valve driving device configured to open and close the intake valve, and to change a closing timing of the intake valve; an injection control unit configured to cause the fuel injection valve to inject fuel in a latter half of a compression stroke in such a manner that a fuel concentration immediately before start of combustion is higher in a middle portion of the combustion chamber than in an outer peripheral portion of the combustion chamber in a low load range where an engine load is lower than a predetermined set reference load; and a valve control unit configured to control the intake valve driving device in such a manner that a closing timing of the intake valve in the low load range is advanced on a retard side with respect to an intake bottom dead center in a case where an engine speed is high, as compared with a case where the engine speed is low, and that intake air within the cylinder is blown back toward the intake port at least in a range where the engine speed is low.

According to the present invention, fuel is injected from the side of the ceiling surface of the combustion chamber toward the crown surface of the piston in the latter half of the compression stroke in such a manner that a fuel-air mixture whose fuel concentration in the middle portion of the combustion chamber is higher than in the outer peripheral portion of the combustion chamber is formed within the combustion chamber in the low load range. This makes it possible to reduce the amount of combustion gas generated in the vicinity of the wall surface of the combustion chamber. Therefore, it is possible to suppress an increase in heat energy of combustion gas, which is released to the outside via the wall surface of the combustion chamber, in other words, to suppress an increase in cooling loss, whereby it is possible to enhance fuel economy.

Further, in the present invention, the intake valve closing timing is controlled to be on the retard side with respect to the intake bottom dead center, and is advanced as the engine speed increases in the low load range. This makes it possible to suppress heat energy of high-temperature intake air accompanied by compression, which is released to the outside via the wall surface of the combustion chamber, and to avoid contact of combustion gas, which may be carried by intake air within the cylinder, with the wall surface of the combustion chamber, whereby it is possible to reduce cooling loss.

Specifically, setting the intake valve closing timing on the retard side with respect to the intake bottom dead center makes it possible to shorten a period after the intake valve is closed until the compression top dead center, during which intake air is compressed. Specifically, it is possible to shorten a period during which high-temperature intake air accompanied by compression comes into contact with the wall surface of the combustion chamber. Therefore, it is possible to suppress heat energy of high-temperature intake air, which is released to the outside via the wall surface of the combustion chamber.

However, in a case where the intake valve closing timing is on the retard side with respect to the intake bottom dead center, and is a timing at which intake air is blown back toward the intake port, intake air is directed toward the intake port within the cylinder, as the piston is lifted toward the ceiling surface of the combustion chamber during a period from the timing in the vicinity of the intake bottom dead center until the intake valve is closed. In a case where intake air vigorously flows toward the intake port, the intake flow may remain within the cylinder even after the intake valve is closed. As a result, after the intake valve is closed, intake air that has flowed toward the intake port may impinge against the intake valve and the ceiling surface of the combustion chamber where the intake valve is disposed, and may further flow along the ceiling surface of the combustion chamber. Then, in the vicinity of the compression top dead center, intake air and a fuel-air mixture may flow along the ceiling surface of the combustion chamber, and combustion gas generated by combustion of the fuel-air mixture is likely to come into contact with the ceiling surface of the combustion chamber, in other words, the wall surface of the combustion chamber.

On the contrary, according to the present invention, as described above, the intake valve closing timing is controlled to be on the advance side as the engine speed increases in the low load range. Specifically, the intake valve is closed at a timing closer to the intake bottom dead center, as the engine speed increases. In other words, the intake valve is closed at a timing at which the lift amount of the piston is small and the flow of intake air toward the intake port is relatively small, as the lifting speed of the piston increases, and accordingly, the intake flow within the cylinder increases. This makes it possible to avoid an increase in the temperature of intake air accompanied by compression while keeping the intake valve closing timing on the retard side with respect to the intake bottom dead center, and to avoid flow of intake air, a fuel-air mixture, and consequently, combustion gas along the ceiling surface of the combustion chamber regardless of the engine speed. The aforementioned configuration is advantageous in avoiding contact of combustion gas with the wall surface of the combustion chamber.

In the direct injection engine of the present invention, preferably, the valve control unit may control the intake valve driving device in such a manner that a closing timing of the intake valve is advanced as the engine speed increases in the low load range.

According to the aforementioned configuration, it is possible to securely avoid flow of intake air toward the intake port, which tends to increase as the engine speed increases, and to avoid flow of intake air and a fuel-air mixture along the wall surface of the combustion chamber, and consequently, to avoid contact between combustion gas and the wall surface of the combustion chamber to thereby reduce cooling loss.

In the direct injection engine of the present invention, preferably, the injection control unit may control fuel injection in such a manner that fuel is injected a plurality of times at a timing more advanced than a compression top dead center so as to form a gas layer substantially devoid of fuel in the vicinity of a wall surface of the combustion chamber within the combustion chamber immediately before start of combustion in the low load range.

According to the aforementioned configuration, it is possible to form a gas layer substantially devoid of combustion gas in the vicinity of the wall surface of the combustion chamber when a fuel-air mixture is combusted, and to securely avoid contact of combustion gas with the wall surface of the combustion chamber.

This application is based on Japanese Patent Application No. 2016-155451 filed on Aug. 8, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A direct injection engine provided with a cylinder including a combustion chamber in which a piston is mounted to be reciprocally movable, comprising:
an intake port opened in a ceiling surface of the combustion chamber, and configured to introduce intake air to the cylinder;
an intake valve configured to open and close an opening portion of the intake port;
a fuel injection valve mounted on the ceiling surface of the combustion chamber, and configured to inject fuel toward a crown surface of the piston;
an intake valve driving device configured to open and close the intake valve, and to change a closing timing of the intake valve;
an injection control unit configured to cause the fuel injection valve to inject fuel in a latter half of a compression stroke in such a manner that a fuel concentration immediately before start of combustion is higher in a middle portion of the combustion chamber than in an outer peripheral portion of the combustion chamber in a low load range where an engine load is lower than a predetermined set reference load; and
a valve control unit configured to control the intake valve driving device in such a manner that a closing timing of the intake valve in the low load range is advanced on a retard side with respect to an intake bottom dead center in a case where an engine speed is high, as compared with a case where the engine speed is low, and that intake air within the cylinder is blown back toward the intake port at least in a range where the engine speed is low in the low load range.

2. The direct injection engine according to claim 1, wherein
the valve control unit controls the intake valve driving device in such a manner that a closing timing of the intake valve is advanced as the engine speed increases in the low load range.

3. The direct injection engine according to claim 2, wherein
the injection control unit controls fuel injection in such a manner that fuel is injected a plurality of times at a timing more advanced than a compression top dead center so as to form a gas layer substantially devoid of fuel in the vicinity of a wall surface of the combustion chamber within the combustion chamber immediately before start of combustion in the low load range.

4. The direct injection engine according to claim 1, wherein
the injection control unit controls fuel injection in such a manner that fuel is injected a plurality of times at a timing more advanced than a compression top dead center so as to form a gas layer substantially devoid of fuel in the vicinity of a wall surface of the combustion chamber within the combustion chamber immediately before start of combustion in the low load range.

* * * * *